United States Patent [19]
Mizuki et al.

[11] Patent Number: 5,921,612
[45] Date of Patent: Jul. 13, 1999

[54] INITIALLY OPENING DEVICE FOR VEHICLE SLIDING DOOR

[75] Inventors: Tetsuro Mizuki, Kofu; Mitsuhiro Watanabe; Manabu Nakajima, both of Yamanashi-ken, all of Japan

[73] Assignee: Mitsui Kinzoku Kogyo Kabushiki Kaisha, Tokyo, Japan

[21] Appl. No.: 08/903,358

[22] Filed: Jul. 30, 1997

[30] Foreign Application Priority Data

| Jul. 30, 1996 | [JP] | Japan | 8-216707 |
| Aug. 7, 1996 | [JP] | Japan | 8-224365 |
| Sep. 3, 1996 | [JP] | Japan | 8-252496 |

[51] Int. Cl.$^6$ ......................... B60J 5/06
[52] U.S. Cl. ............... 296/155; 292/341.16; 49/360
[58] Field of Search ............ 296/155; 292/341.16, 292/DIG. 23; 49/360, 279, 280

[56] References Cited

U.S. PATENT DOCUMENTS

| 3,002,369 | 10/1961 | Chanaryn et al. | 292/DIG. 23 |
| 4,363,249 | 12/1982 | Kleefeldt | 292/DIG. 23 |
| 4,707,007 | 11/1987 | Inoh | 292/341.16 |
| 4,842,313 | 6/1989 | Boyko et al. | 296/155 |
| 4,848,031 | 7/1989 | Yamagishi et al. | 49/280 |
| 5,083,397 | 1/1992 | Koura | 49/280 |
| 5,092,637 | 3/1992 | Miller . | |
| 5,172,947 | 12/1992 | Schap | 292/341.16 |
| 5,186,516 | 2/1993 | Alexander et al. | 292/341.16 |
| 5,433,496 | 7/1995 | Zimmermann | 292/DIG. 23 |
| 5,785,364 | 7/1998 | Kleefeldt et al. | 292/341.16 |

FOREIGN PATENT DOCUMENTS

| 000469194 | 2/1992 | European Pat. Off. | 49/360 |
| 406048178 | 2/1994 | Japan | 296/155 |
| 406048179 | 2/1994 | Japan | 296/155 |
| 8-013883 | 1/1996 | Japan . | |

*Primary Examiner*—Joseph D. Pape
*Assistant Examiner*—Kiran Patel
*Attorney, Agent, or Firm*—Browdy and Neimark

[57] ABSTRACT

An initially opening device for a vehicle sliding door comprises an output member rotated by a motor, a winch lever rotated from a stand-by position to an initial-open position, a connecting lever for connecting the output member to the winch lever, a press member provided in the sliding door and connected to the winch lever, a ratchet lever connected to a latch unit provided at rear portion of the door for engaging a striker fixed to a vehicle body, and a contact surface formed in the ratchet lever and brought into contact with the winch lever for rotating the ratchet lever when the winch lever is rotated toward the initial-open position. The press member is brought into contact with the vehicle body to move the rear portion of the sliding door in an initial opening direction when the winch lever is displaced from the stand-by position to the initial-open position.

12 Claims, 9 Drawing Sheets

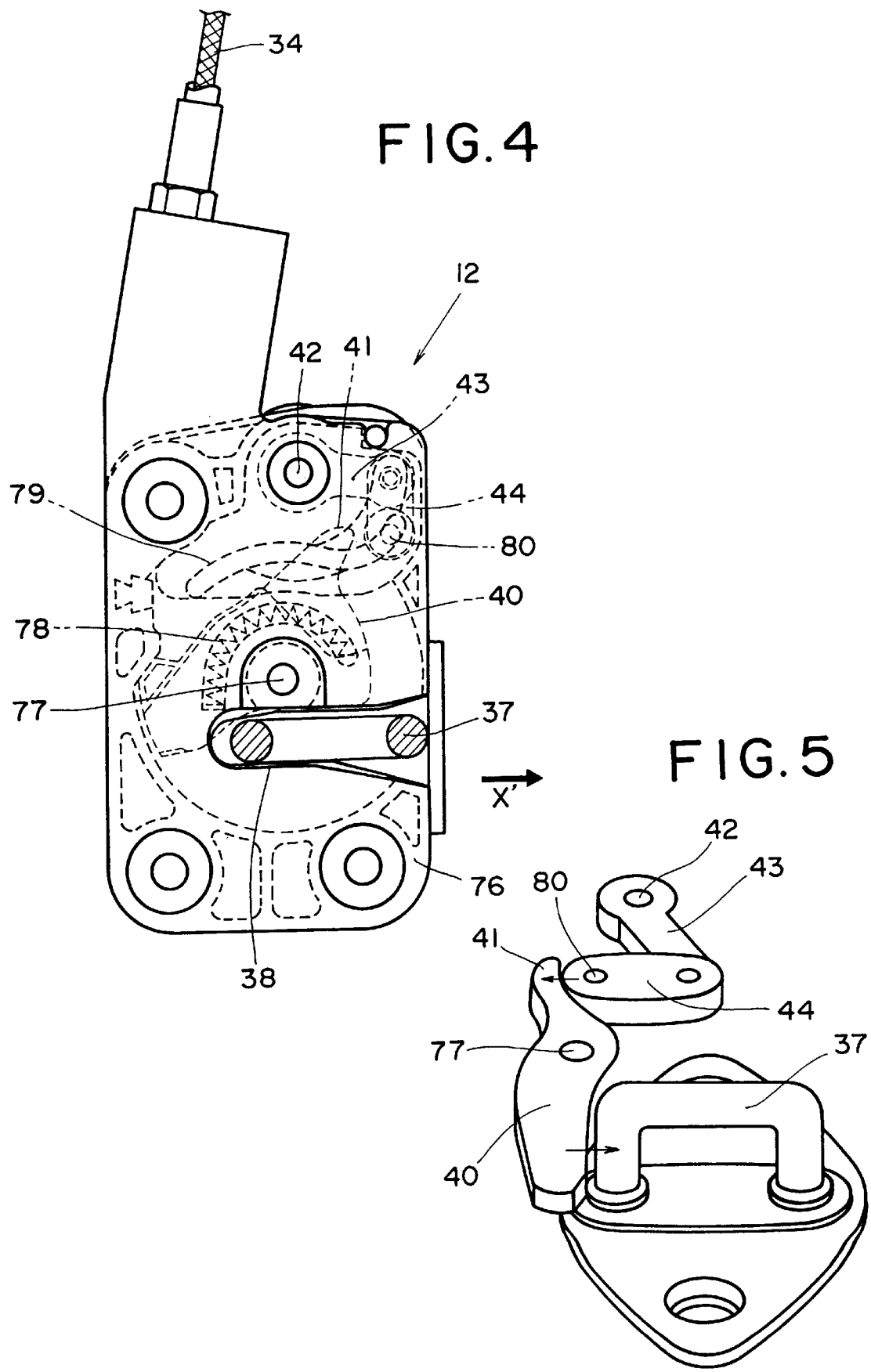

INITIALLY OPENING DEVICE FOR VEHICLE SLIDING DOOR

FIELD OF THE INVENTION

The present invention relates to an initially opening device for a vehicle sliding door and, more particularly to a device for initially opening a sliding door which is frozen to a vehicle body.

DESCRIPTION OF PRIOR ART

As shown in FIG. 1, a conventional sliding door A has a front latch unit D which engages with a front striker C fixed to a vehicle body B, and a rear latch unit F which engages with a rear striker E also fixed to the vehicle body B. When closing the sliding door A, the sliding door A first slides in a direction of an arrow Y parallel to the vehicle body B until the front latch unit D engages with the front striker C. Then, a rear portion G of the sliding door A moves in a direction of an arrow X as rotating about the engaging point of the front latch unit D with the front striker C until the rear latch unit F engages with the rear striker E, thereby the sliding A is closed completely.

When opening the conventional sliding door A, the latch units D and F are released from the strikers C and E by door-opening operation of an open handle H of the door. The rear portion G of the sliding door A is first pushed in a direction opposed to the arrow X by resilient force of a weather rubber seal (not shown) provided between the rear portion G of the sliding door A and the vehicle body B, and the sliding door A is then pushed in a direction opposed to the arrow Y by resilient force of a rubber seal (not shown) provided between a front portion J of the sliding door A and the vehicle body B, thereby the sliding door A is initially opened. Thus, the sliding door A cannot slide in the direction opposed to the arrow Y until the rear portion G has been separated from the vehicle body B.

As the sliding door A is characterized by the above structure, if the sliding door A is frozen to the vehicle body B due to the cold and the initial opening of the sliding door A is not made by the resilient force of the rubber seal, it is very difficult to open the sliding door A initially. Because it is substantially impossible to supply a force to the rear portion G of the sliding door A by using the open handle H provided at the front portion J of the sliding door A in order to move the rear portion G in the direction opposed to the arrow X. This problem is conventionally solved by providing the open handle H at the rear portion G of the sliding door A, however, if the open handle H is attached to the rear portion G, operability of the sliding door A in normal condition is extremely degraded.

SUMMARY OF THE INVENTION

Accordingly, an object of the present invention is to provide a device for initially opening a sliding door, which is frozen to a vehicle body, by using a motor power.

BRIEF DESCRIPTION OF THE DRAWINGS

FIG. 4 is a cross-sectional view showing the opening unit and a stationary member in a door closed status;

FIG. 5 is a perspective view showing the opening unit and the stationary member;

DETAILED DESCRIPTION OF THE PREFERRED EMBODIMENTS

Figure 2:
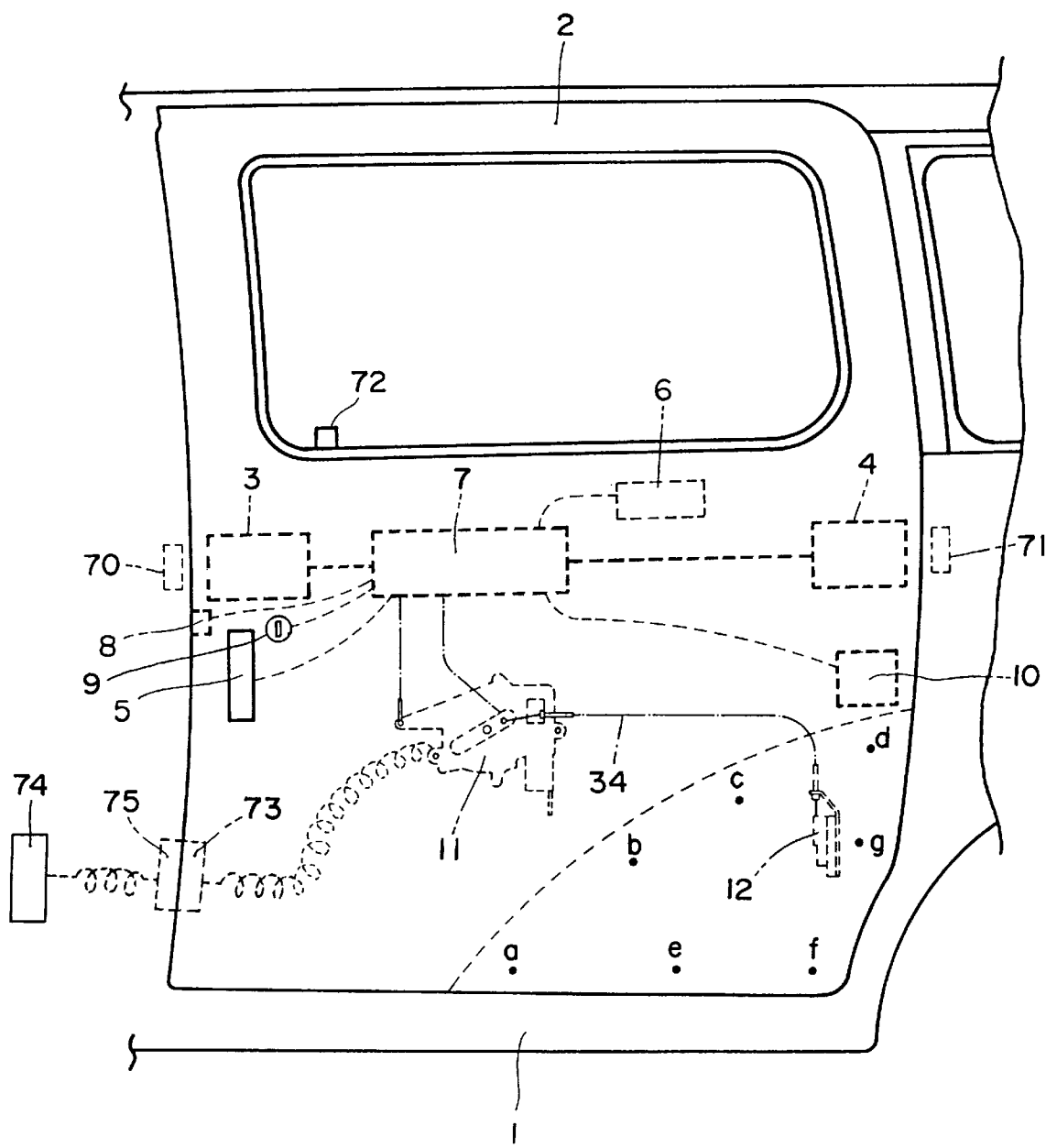
FIG. 2 is a schematic elevation view showing various components provided at a sliding door of the present invention.

An embodiment of the present invention will now be described in detail in accordance with the accompanying drawings. FIG. 2 shows a vehicle sliding door 2 which is slidably attached to a vehicle body 1. The door 2 has a front latch unit 3 which is provided at a front end portion thereof and is engageable with a front striker 70 fixed to the vehicle body 1, a rear latch unit 4 which is provided at a rear end portion of the sliding door 2 and is engageable with a rear striker 71 also fixed to the vehicle body 1, an outer open handle 5 which is provided on an outer door panel of the sliding door 2, an inner open handle 6 which is provided on an inner door panel of the sliding door 2, and a relay assembly 7 which is provided at an internal space of the sliding door 2. The relay assembly 7 has an opening mechanism, a lock mechanism and a child-proof mechanism, and operational forces of the open handles 5 and 6 are transmitted to the latch units 3 and 4 via the opening mechanism of the relay assembly 7.

The sliding door 2 has a key cylinder 9 which is provided on the outer panel of the sliding door 2, and an inside lock knob 72 which is provided on the inner panel of the sliding door 2. The key cylinder 9 and lock knob 72 are connected to the lock mechanism for changing over between locked and unlocked conditions of the mechanism. The sliding door 2 further has a child-proof knob 8 which is provided at the front end portion of the sliding door 2 and is connected to the child-proof mechanism for changing over between child-proof and non-proof conditions of the mechanism, an open-position holder 10 for holding the sliding door 2 at a full-open position, an opening unit or releasing unit 12 for moving a rear portion of the sliding door 2 away from the vehicle body 1, a motorized actuator unit 11 which actuates the opening unit 12, and a connector 73 which is provided at the front end portion of the sliding door 2 and is electrically connected to the actuator unit 11. The vehicle body 1 has a connector 75 connected to a battery 74 of the vehicle body 1. When the door is in the closed state, the connector 73 is brought into contact with the connector 75 so that the electrical power of the battery 74 is supplied to the actuator unit 11. Note that the key cylinder 9 may be omitted.

Figure 1:
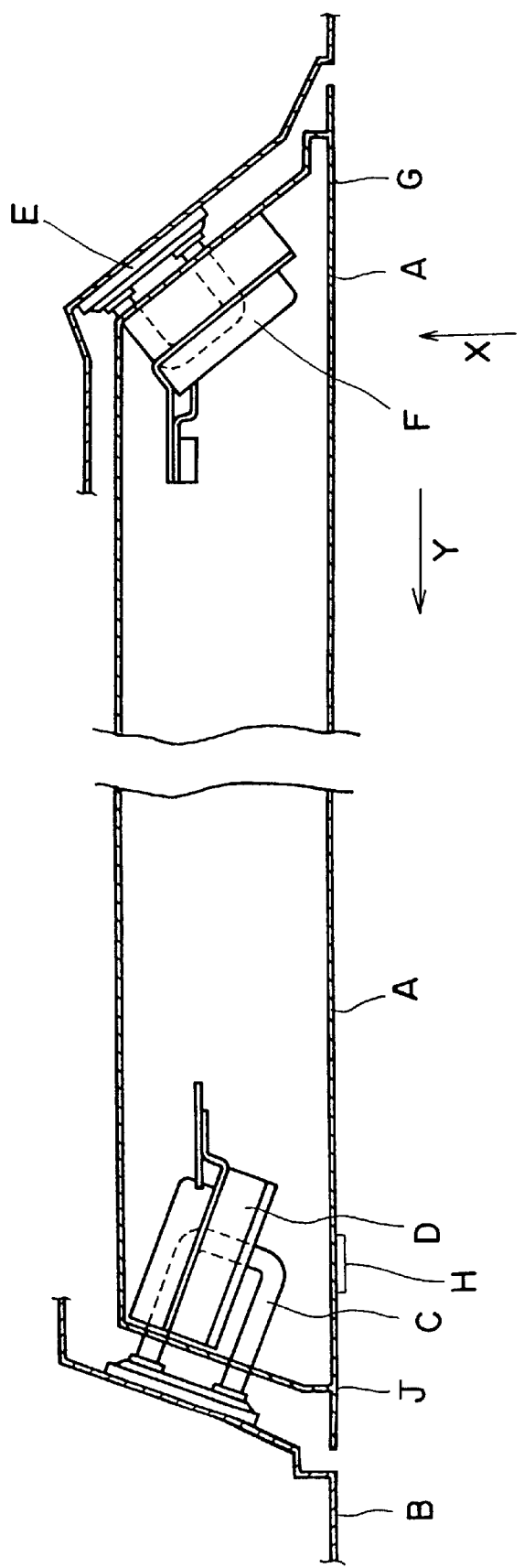
FIG. 1 is a schematic view showing a movement of a conventional sliding door.
Figure 3:
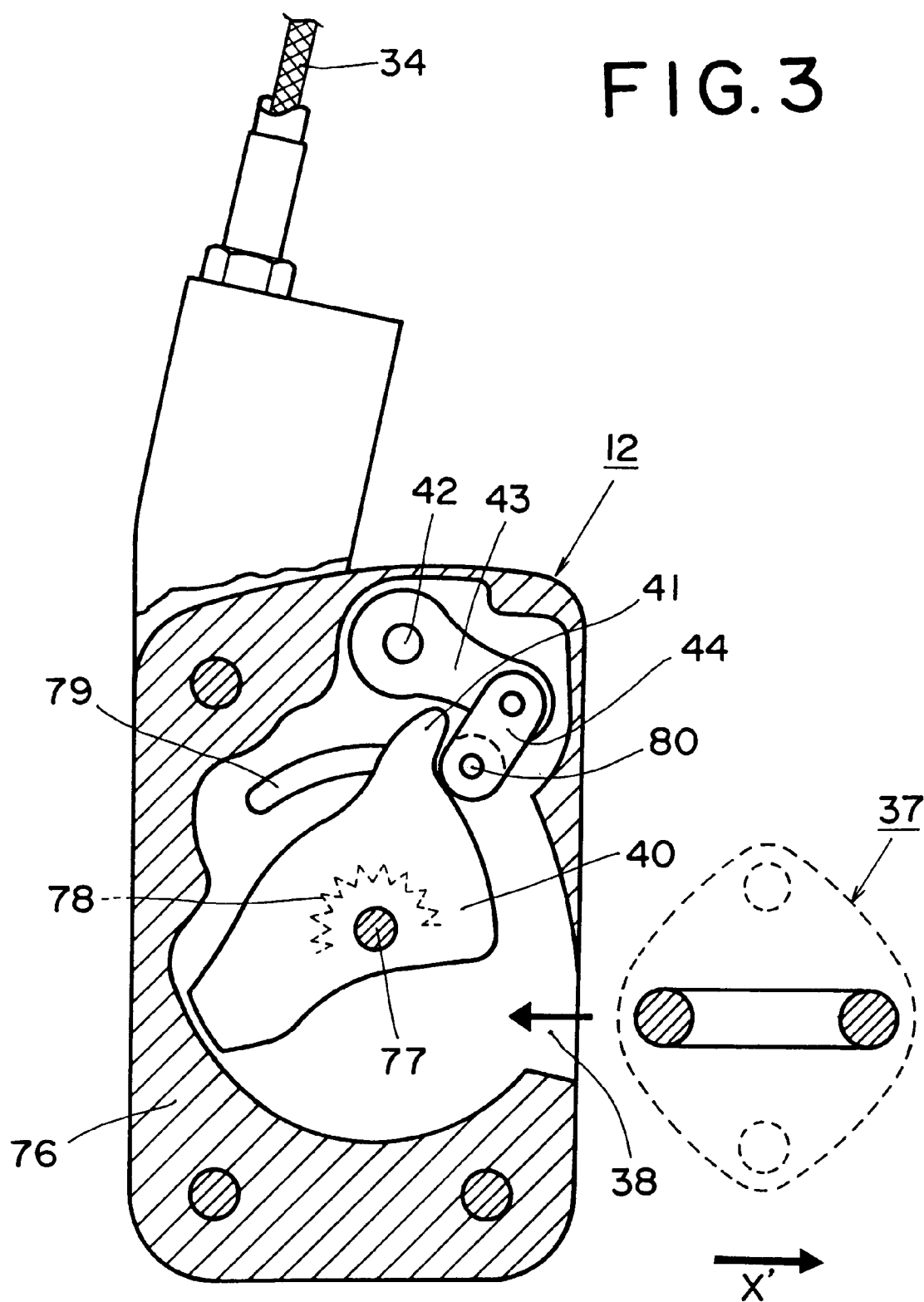
FIG. 3 is a cross-sectional view of an opening unit.
Figure 6:
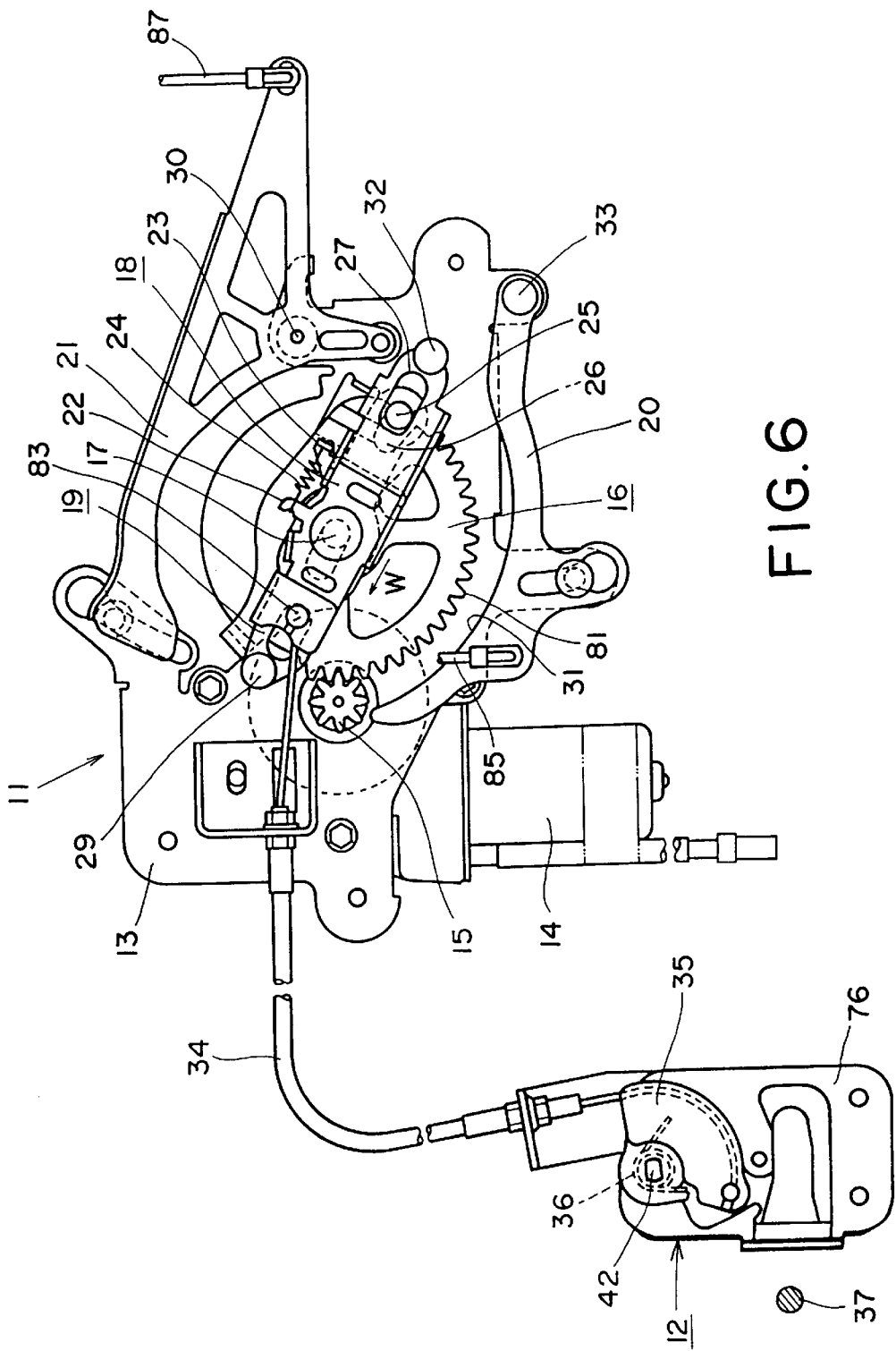
FIG. 6 is a front view of a motorized actuator unit.

As shown in FIGS. 3 and 4, a housing 76 of the opening unit 12 has a horizontal recess 38 which receives a U-shaped stationary member 37 fixed to the vehicle body 1 when the sliding door 2 moves by door closing operation in a direction of an arrow X' which is the same direction of the arrow X in FIG. 1. A press member 40 is rotatably supported by a shaft 77 at the central portion of the housing 76 and is biased by resilient force of a spring 78 in a clockwise direction in FIG. 3. The housing 76 has a substantially horizontal guide groove 79 with which an arm 41 of the press member 40 is overlapped. A pin 80 of a sliding member 44 is slidably engaged with the guide groove 79. The sliding member 44 is connected to a first lever 43 which is fixed to a shaft 42. As shown in FIG. 6, a second lever 35 is fixed to one end of the shaft 42 which is projected toward a rear side of the housing 76. The second lever 35 is biased by resilient force of a spring 36 in a clockwise direction in FIG. 6 and is connected to the actuator unit 11 via a wire cable 34 so that the second lever 35 is rotated against the resilient force of the spring 36 by the power of the actuator unit 11.

In a status where the sliding door 2 is closed, if the second lever 35 is rotated by the power of the actuator unit 11, the first lever 43 is also rotated via the shaft 42, then the sliding member 44 is slid to the left side in FIG. 4 to abut against the arm 41 of the press member 40. When the first lever 43 is further rotated, the press member 40 is rotated counterclockwise to abut against the stationary member 37, thereby the opening unit 12, i.e., the rear portion of the sliding door 2 moves away from the stationary member 37 in a direction opposed to the arrow X'. Accordingly, even if the sliding door 2 is frozen to the vehicle body 1, the sliding door 2 can be easily initially opened by the power of the actuator unit 11.

As the sliding door 2 is frozen to the vehicle body 1 due to water collected between the sliding door 2 and the vehicle body 1, there is a high probability that a lower portion of the sliding door 2 is frozen to the vehicle body 1. Further, to open the frozen sliding door 2, it is necessary to move the rear portion of the sliding door 2 from the vehicle body 1. For this purpose, as shown with points a to g in FIG. 2, the opening unit 12 can be effectively used if it is provided at a rear and a lower position of the sliding door 2.

Figure 7:
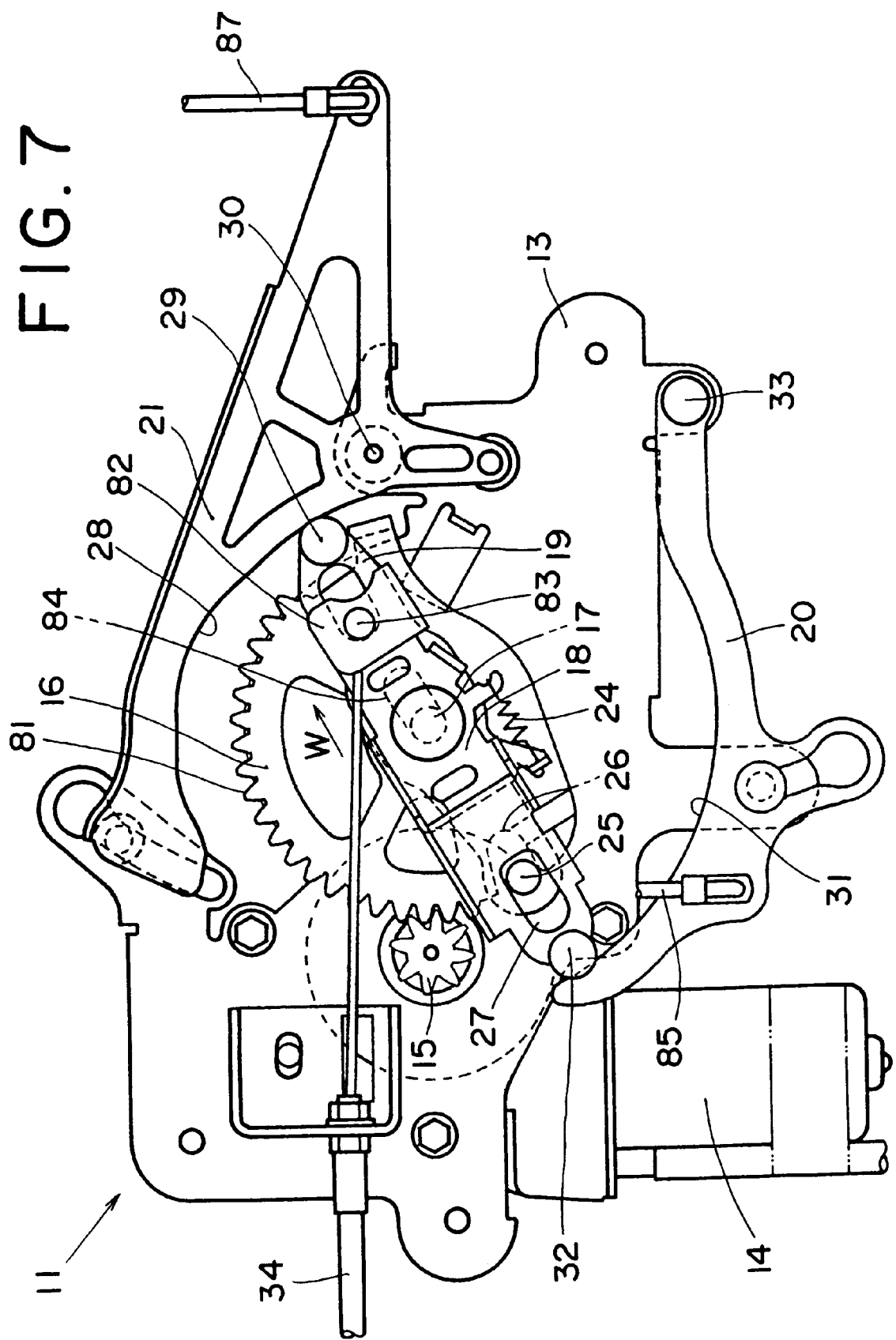
FIG. 7 is an enlarged view showing operation of the motorized actuator unit.
Figure 9:
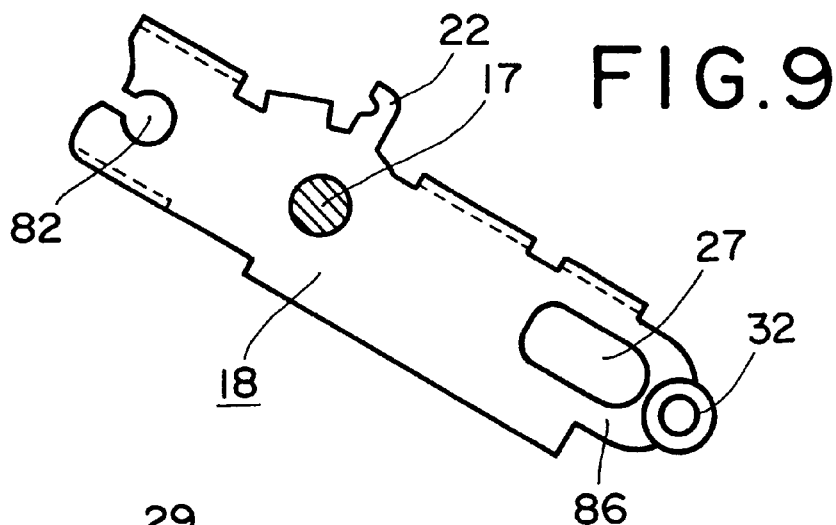
FIG. 9 is a front view of a winch lever.
Figure 10:
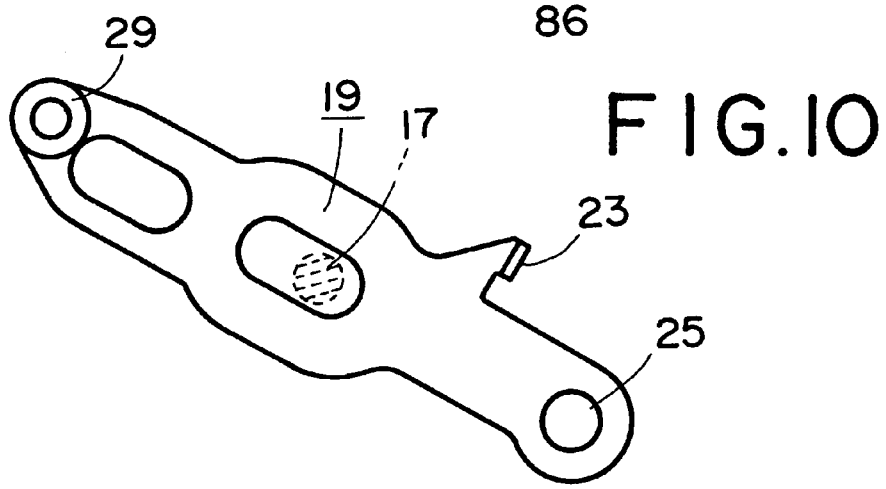
FIG. 10 is a front view of a connecting lever.
Figure 8:
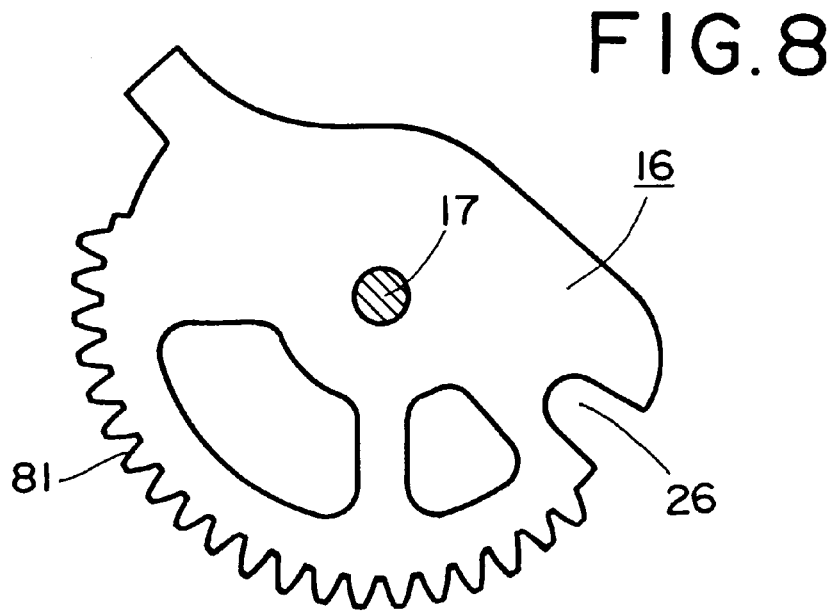
FIG. 8 is a front view of an output member.

As shown in FIGS. 6 and 7, the actuator unit 11 has a metal base plate 13 and a motor 14 fixed to the base plate 13. A semicircular output member 16 is attached to the base plate 13 via a shaft 17 at about the center of the base plate 13. The output member 16 has at its peripheral edge a toothed portion 81 with which a gear 15 of the motor 14 is meshed. The shaft 17 rotatably supports a winch lever 18 which has one end 82 connected to a head 83 of the wire cable 34. A connecting lever 19 is provided between the winch lever 18 and the output member 16 and has an elliptic hole 84 through which the shaft 17 is inserted. The connecting lever 19 can slide by a distance corresponding to play space between the elliptic hole 84 and the shaft 17.

The connecting lever 19 has at one end a pin 25 which is projected from opposite sides of the connecting lever 19. One side of the pin 25 is slidably engaged with an elliptic hole 27 of the winch lever 18, while the other side of the pin 25 is slidably engaged with a U-shaped recess 26 of the output member 16. A spring 24 is provided between a bent piece 23 of the connecting lever 19 and a projection 22 of the winch lever 18 so as to bias the connecting lever 19 in a direction of an arrow W. The engagement between the pin 25 of the connecting lever 19 and the U-shaped recess 26 of the output member 16 is maintained by the resilient force of the spring 24.

FIG. 6 shows a standby state of the actuator unit 11 in which one side of the pin 25 of the connecting lever 19 is engaged with the hole 27 of the winch lever 18 and the other side of the pin 25 is engaged with the recess 26 of the output member 16. In this state, when the output member 16 is rotated clockwise by the motor 14, the connecting lever 19 is also rotated clockwise due to the engagement of the pin 25 with recess 26, and the winch lever 18 is then rotated to an initial-open position shown in FIG. 7 from a stand-by position shown in FIG. 6 due to the engagement of the pin 25 with the hole 27 in order to draw the wire cable 34. Thus, the power of the motor 14 is transmitted to the opening unit 12 through the cable 34.

A ratchet lever 20 is mounted at the lower portion of the base plate 13 by a shaft 33 and is connected to well-known ratchets (not shown) of the latch units 3 and 4 via a rod or a wire 85. The ratchet lever 20 rotates the ratchets to release the engagement between the latch units 3, 4 and the strikers 70, 71 when turned. A curved surface 31 is formed in the ratchet lever 20, and a roller 32 is provided at a tip end 86 of the winch lever 18. The roller 32 is brought into contact with the curved surface 31 to rotate the ratchet lever 20, when the winch lever 18 is rotated by the motor 14. Accordingly, when the motor 14 is driven to rotate the winch lever 18 clockwise in FIG. 6, the latch units 3 and 4 are released from the strikers 70 and 71 by the operation of the ratchet lever 20, and the rear portion of the sliding door 2 is moved in the direction opposed to the arrow X' by the operation of the opening unit 12, thereby the door 2 is initially opened. Note that the latch units 3 and 4 are released from the strikers 70 and 71 before a force in the counter arrow X' direction is applied to the rear portion of the sliding door 2.

When the sliding door 2 is initially opened by the power of the motor 14, the connector 73 of the sliding door 2 is separated from the connector 75 of the vehicle body 1 so that the motor 14 loses power. Accordingly, the winch lever 18 which is displaced by the power of the motor 14 to the initial-open position shown in FIG. 7, cannot return to the stand-by position shown in FIG. 6 by the power of the motor 14, and the winch lever 18 remains staying at the initial-open position. The actuator unit 11 of the present invention therefore has a cancelling lever 21 for returning the winch lever 18 to the stand-by position. The cancelling lever 21 is mounted at an upper portion of the base plate 13 by a shaft 30. The cancelling lever 21 has a curved surface 28 with the shaft 17 as the center. The cancelling lever 21 is connected to the open handles 5 and 6 via a rod 87. When one of the open handles 5 and 6 is operated, the curved surface 28 of the cancel lever 21 is brought into contact with a pin 29 of the connecting lever 19 to slide the connecting lever 19 in a direction opposed to the arrow W against the resilient force of the spring 24, to thereby detach the pin 25 of the connecting lever 19 from the recess 26 of the output member 16. Then, the connecting lever 19 is released from the output member 16, and the winch lever 18 is also free from the output member 16. Accordingly, the winch lever 18 and connecting lever 19 are rotated counterclockwise by the resilient force of the spring 36 of the opening unit 12, and returns to the stand-by position. Note that the output member 16 at the position in FIG. 7 is returned to the position as shown in FIG. 6 when the motor 14 is connected to the battery 74 by a next door-closing operation.

According to the present invention, the motor 14 is driven to rotate the output member 16 when the outer open handle 5 of the sliding door 2 is operated. A switch 88 for detecting the operation of the handle 5 is provided at a position in the vicinity of the cancelling lever 21 which is connected to the handle 5 by way of the rod 87.

Figure 11:
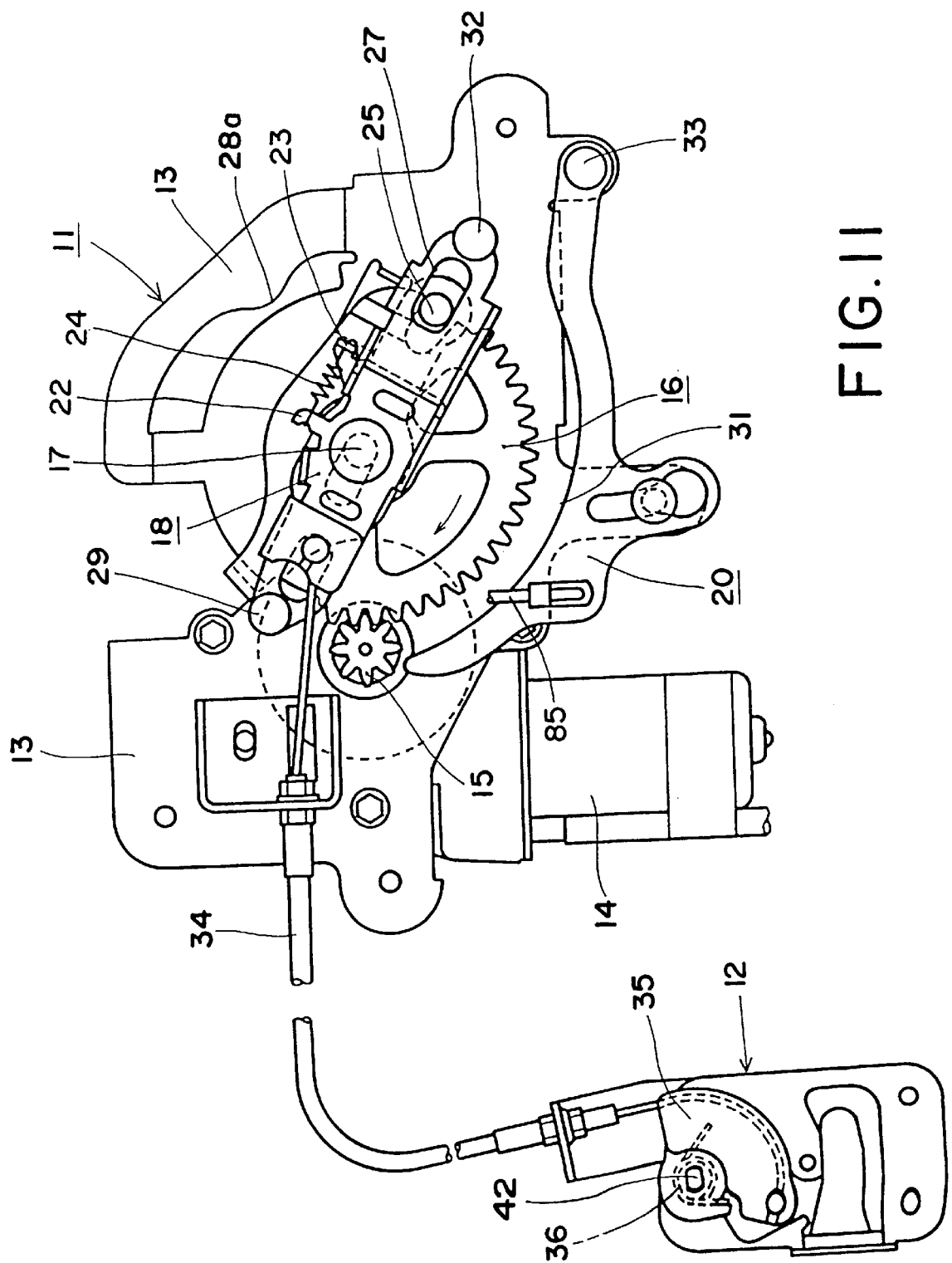
FIGS. 11 and 12 are front views showing a second embodiment of the present invention.
Figure 12:
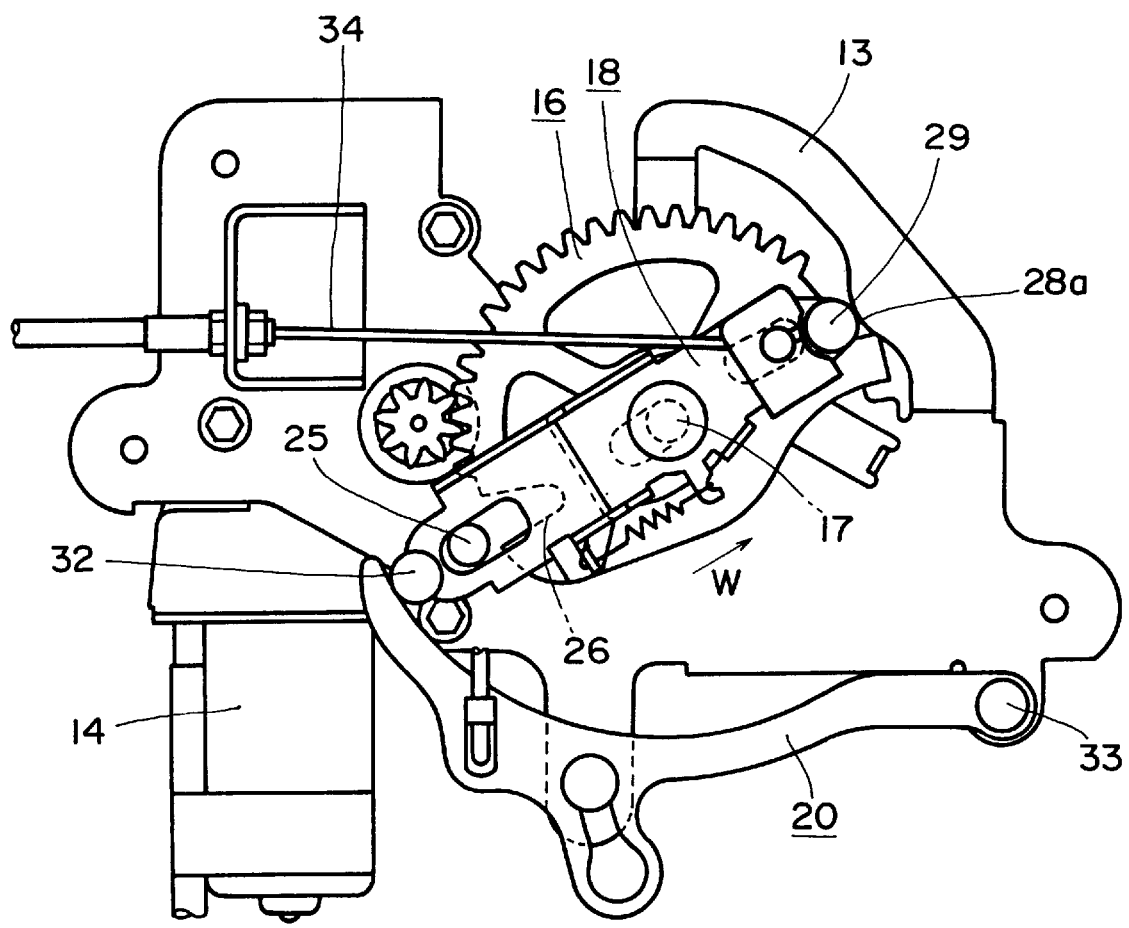

FIGS. 11 and 12 show a second embodiment of the present invention which has an immovable cancelling cam 28a having a function corresponding to the movable cancelling lever 21 of the first embodiment. The immovable cam 28a is integrally formed with the base plate 13 of the second embodiment. The cancelling cam 28a swells towards the shaft 17 so that the cancelling cam 28a is brought into contact with the pin 29 of the connecting lever 19 and slides the connecting lever 19 in the direction opposed to the arrow W as shown in FIG. 12 in order to release the pin 25 from the recess 26 of the output member 16 when the winch lever 18 is rotated clockwise to the initial-open position from the stand-by position. Thereby the winch lever 18 and the connecting lever 19 return to the stand-by positions by the resilient force of the spring 36 of the opening unit 12. Note that the connecting lever 19 slides at the same time of the initial opening of the sliding door 2, which prevents a problem that the amount of sliding of the connecting lever 19 becomes insufficient.

What is claimed is:

1. An initially opening device in a vehicle sliding door slidably attached to a vehicle body and having a latch unit at a rear portion of the sliding door engageable with a striker fixed to the vehicle body, said device comprising:

an electric motor provided within the sliding door;

a winch lever rotated by the motor from a stand-by position to an initial-open position; and a press member provided in the sliding door and connected to the winch lever by way of a wire cable and displaceable from a stand-by position to an initial-open position due to movement of the winch lever;

wherein said press member is brought into contact with the vehicle body to move the rear portion of the sliding door in an initial opening direction when the press member is displaced from the stand-by position to the initial-open position;

said device further comprising a ratchet lever connected to the latch unit for releasing engagement between the latch unit and the striker when rotated, and a contact surface formed in the ratchet lever and brought into contact with the winch lever for rotating the ratchet lever when the winch lever is rotated toward the initial-open position.

2. The initially opening device according to claim 1, wherein said press member is provided at the rear portion of the sliding door.

3. The initially opening device according to claim 2, wherein said press member is provided at a lower portion of the sliding door.

4. The initially opening device according to claim 1, wherein said ratchet lever releases the latch unit from the striker before the movement of the press member toward the initial-open position is completed.

5. An initially opening device for a vehicle sliding door slidably attached to a vehicle body and having a latch unit at a rear portion of the sliding door for being engaged with a striker fixed to the vehicle body, said device comprising:

an electric motor provided within the sliding door;

a winch lever rotated by the motor from a stand-by position to an initial-open position; and a press member provided in the sliding door and connected to the winch lever by way of a wire cable and displaceable from a stand-by position to an initial-open position due to movement of the winch lever;

wherein said press member is brought into contact with the vehicle body to move the rear portion of the sliding door in an initial opening direction when the press member is displaced from the stand-by position to the initial-open position;

said device further comprising a switch for detecting operation of an outer open handle of the sliding door, wherein said motor is actuated by a detection signal from the switch.

6. An initially opening device for a vehicle sliding door slidably attached to a vehicle body and having a latch unit at a rear portion of the sliding door for being engaged with a striker fixed to the vehicle body, said device comprising:

an electric motor provided within the sliding door;

a winch lever rotated by the motor from a stand-by position to an initial-open position; and a press member provided in the sliding door and connected to the winch lever by way of a wire cable and displaceable from a stand-by position to an initial-open position due to movement of the winch lever;

wherein said press member is brought into contact with the vehicle body to move the rear portion of the sliding door in an initial opening direction when the press member is displaced from the stand-by position to the initial-open position;

said device further comprising an output member rotated by the motor, and a connecting lever provided between the output member and the winch lever and displaceable between a connecting position for connecting the output member to the winch lever and a disconnecting position for disconnecting the output member from the winch lever.

7. The initially opening device according to claim 6, further comprising a cancelling lever connected to an outer open handle of the sliding door and displacing the connecting lever from the connecting position to the disconnecting position when rotated, and a return spring for biasing the winch lever toward the stand-by position, wherein said winch lever returns to the stand-by position by resilient force of the return spring when the connecting lever is displaced into the disconnecting position by the rotation of the cancelling lever.

8. The initially opening device according to claim 6, further comprising an immovable cam surface brought into contact with the connecting lever to displace the connecting lever from the connecting position to the disconnecting position when the winch lever is rotated to the initial-open position, and a return spring for biasing the winch lever toward the stand-by position, wherein said winch lever returns to the stand-by position by resilient force of the return spring when the connecting lever is displaced into the disconnecting position.

9. The initially opening device according to claim 5, wherein said press member is provided at the rear portion of the sliding door.

10. The initially opening device according to claim 9, wherein said press member is provided at a lower portion of the sliding door.

11. The initially opening device according to claim 6, wherein said press member is provided at the rear portion of the sliding door.

12. The initially opening device according to claim 11, wherein said press member is provided at a lower portion of the sliding door.

* * * * *